Dec. 25, 1962

H. A. TOULMIN, JR 3,070,173

CONTROL APPARATUS FOR SYNCHRONIZING AIRCRAFT PROPELLERS

Filed July 31, 1961

INVENTOR.
HARRY A. TOULMIN, JR.
By Toulmin & Toulmin
Attorneys

Dec. 25, 1962  H. A. TOULMIN, JR  3,070,173
CONTROL APPARATUS FOR SYNCHRONIZING AIRCRAFT PROPELLERS
Filed July 31, 1961  2 Sheets-Sheet 2

INVENTOR.
HARRY A. TOULMIN, JR.
By Toulmin & Toulmin
Attorneys

United States Patent Office 3,070,173
Patented Dec. 25, 1962

3,070,173
CONTROL APPARATUS FOR SYNCHRONIZING
AIRCRAFT PROPELLERS
Harry A. Toulmin, Jr., Dayton, Ohio, assignor to
Basic Research Inc., Dayton, Ohio
Filed July 31, 1961, Ser. No. 127,921
7 Claims. (Cl. 170—135.29)

The present invention is related to a control apparatus for synchronising two or more independently driven, pitch-adjustable aircraft propellers.

Modern aircraft are equipped with propellers, the blades of which are made pitch-adjustable, the blades usually can be positioned so as to offer minimum air resistance, in which case the propeller is said as being feathered. On the other hand the blades can be positioned so as to offer maximum air resistance, this operating condition is often employed for braking after landing. Intermediate pitch adjustments of the blades can be employed for speed controlling the propeller. Multi-engine aircraft often exhibit asynchronism between the several propellers, whereby undesired and unpleasant vibrations are produced.

It is a primary object of the present invention to provide a new and improved control apparatus for effectively synchronising the speeds of aircraft propellers.

It is another object of the present invention to provide a new and improved indicating device, showing to the pilot the degree of the propeller synchronism or asynchronism, as well as the operating conditions of a synchronising device.

It is a further object of the invention to provide for an electronic control apparatus, synchronising the speed of a slave propeller with that of a master propeller.

It is a feature of the present invention to derive rotary motions from two independently driven propellers, respectively called master and slave propeller, one rotary motion is transmitted to a disc with a slot for rotation thereof, while the other rotary motion produces a train of switching pulses which, in turn, operate upon a light flashing device, so that a train of light pulses are emanated toward the rotating disc. A photo-electric device senses the phase relationship between the rotating slot in the disc and the occurrence of the light pulses. An electro-hydraulic conversion system produces control pulses in dependence upon the measured phase relationship, so as to hydraulically adjust the pitch of one of the propellers.

Further features of the invention are, separate photoelectric detectors sensing a phase difference between light pulses and disc slot, which is increasing in spite of a control action produced by the electro-hydraulic conversion system. Those indicators then initiate a feathering of the slave propeller.

Another feature is the provision of a small instrument propeller rotating with the disc and being stroboscopically illuminated by the light pulses so as to indicate the phase relationship between master and slave propeller.

While the specification concludes with claims particularly pointing out, and distinctly claiming the subject matter which is regarded as the invention, it is believed that the invention, the objects of the invention, and further objects and advantages thereof, will be better understood from the following description taken in connection with the accompanying drawing in which:

Figure 1:
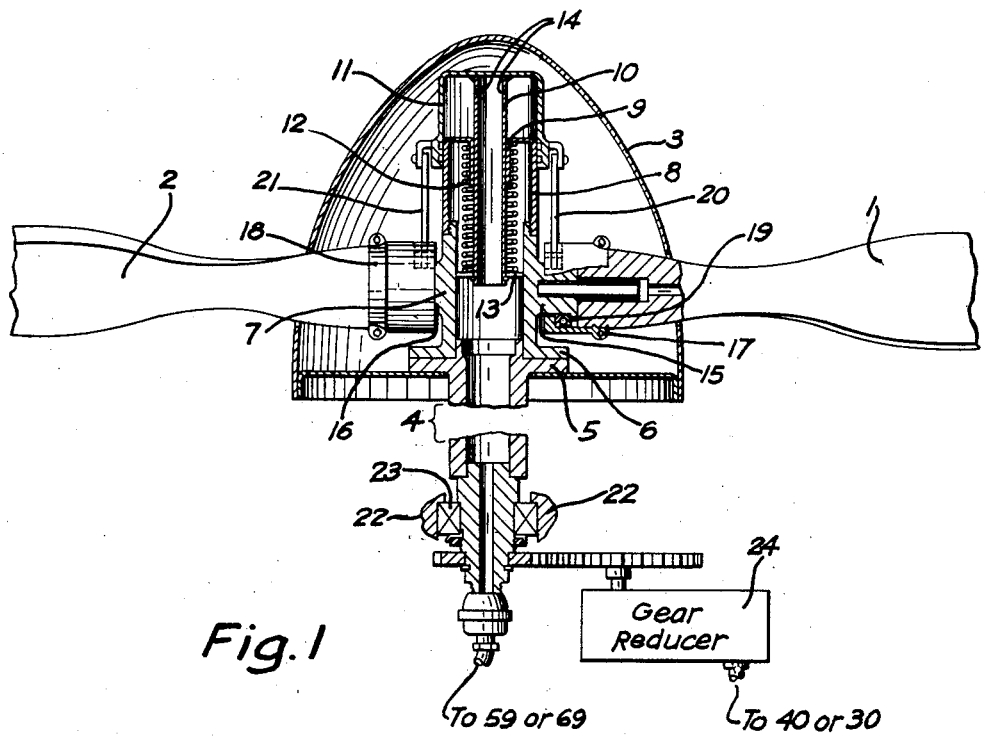
FIG. 1 illustrates a cross-sectional view of a pitch adjustable propeller to be employed in the inventive control apparatus.

In FIG. 1 of the drawing, there is first shown the hydraulically operated propeller pitch adjustment device. A propeller having blades 1 and 2 and rotating together with the casing 3 is mounted on a hollow shaft 4. Shaft 4 is provided with a flange 5 to which is secured a flange 6 of a hollow drive hub 7 terminating in a hollow piston 8 having a stem portion 9.

A tube 10 is slidably received by stem portion 9 and carries a cylinder 11 sealingly engaging piston 8. A spring 12 rests against piston 8 as well as against a disc 13, which is secured to a tube 10. The inner porttion of tube 10 communicates with cylinder 11 by means of port holes 14.

Hub 7 has two protruding studs 15 and 16 serving as support for blades 1 and 2 respectively, and a roller thrust bearing 19 rotatably engages blade 1 with stud 15. There is a corresponding thrust bearing for blade 2 and stud 16 which is not shown. Turning the blades about the supporting studs, causes the propeller pitch to be varied.

Mechanical links 20 and 21 pivotally connect cylinder 11 with blades 1 and 2 respectively. Thus, when cylinder 11 moves up and down with respect to piston 8, blades 1 and 2 are simultaneously and respectively pivoted about studs 15 and 16.

Tubular shaft 4 is journalled in the housing of the plane which is indicated by reference numeral 22, and there is provided a bearing 23 for this shaft 4. The rotary gear of the propeller and of shaft 4, as well as the engine driving the propeller are not shown for reasons of simplicity, and it is understood that these elements are of conventional design.

Reference numerals 30, 40, 59 and 69 will be described in connection with FIG. 2.

Figure 2:
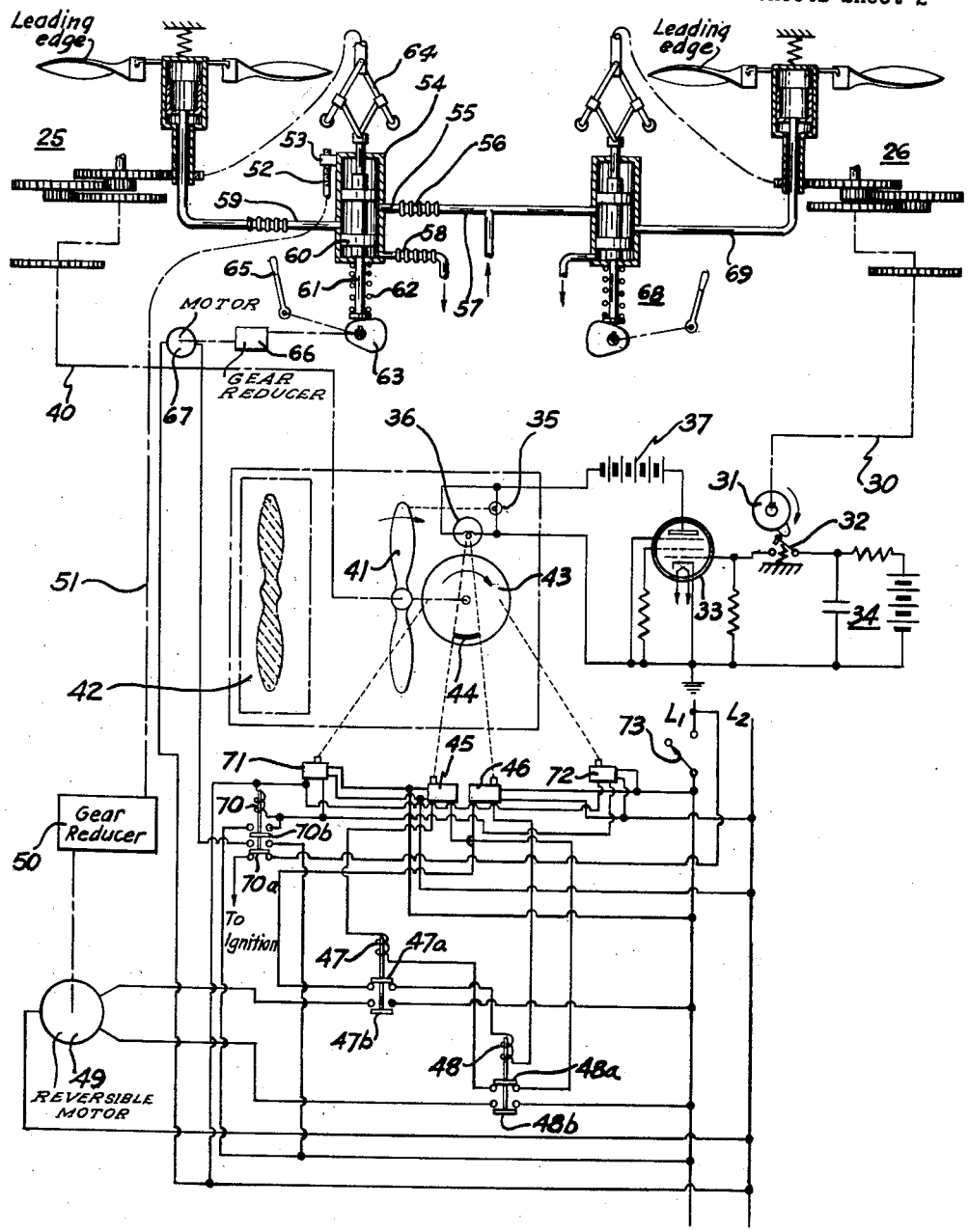
FIG. 2 illustrates a circuit diagram of a control apparatus in accordance with the invention, and includes a schematic view of a master propeller and a slave propeller with their hydraulic adjustment and control elements.

Proceeding now to FIG. 2 which described in detail the control circuit constituting the present invention, reference numerals 25 and 26 designate pitch-adjustable propellers of the type described in detail in FIG. 1. Propeller 26 is the master propeller and propeller 25 is the slave propeller. The control apparatus to be described in the following, has as its primary purpose to synchronise slave propeller 25 with master propeller 26. The speed of propeller 26 is indicatively derived from the rotation of its shaft by means of a shaft 30 rotating a cam disc 31 to be described later in detail in connection with FIG. 3. Cam disc 31 operates upon a spring biased blade 32, which connects the control grid circuit of an electron tube 33 to a positive voltage bias source 34. The plate circuit of tube 33 is comprised of two lamps 35 and 36 and of a suitable voltage source, such as battery 37. These elements constitute the master propeller control-pulse source: Upon rotation of propeller 26 current pulses of short duration flow through electron tube 33, and correspondingly a train of short light pulses are emitted from lamps 35 and 36. These light pulses are emitted in precise synchronism with propeller 26 and they are likewise also indicative of a particular phase position of the propeller blades.

Proceeding now to the input for the control apparatus as derived from slave propeller 25, there is firstly provided a shaft 40, rotating in case of ideal synchronism at precisely the same speed as shaft 30. An instrument propeller 41 is mounted on shaft 40 and rotates therewith. Propeller 41 thus rotates in precise relationship to propeller 25. Furthermore, propeller 41 is disposed in the light path extending from lamp 35, so that an image appears on a screen 42, which is part of the instrument board in the cockpit of the aeroplane. A disc 43 with a slot 44 is also mounted on shaft 40. The drawing is only schematic in character, but the instrument propeller 41 is to have an upright position whenever slot 44 is aligned with light paths from lamp 36 terminating in both of two photo-electric detector-amplifiers 45 and 46. This means, that if light pulses are emitted from lamps 36 and 35 at the time propeller 41 stands, for example, upright, the light pulse from lamp 36 reaches both detectors 45 and 46 and the light pulse from lamp 35 produces an up-standing image of propeller 41 on screen 42. This is to be the neutral or zero position, which indicates perfect phase and speed synchronism of shafts 40 and 30 and, therefore, of propellers 35 and 26. Slot 44 is so wide that a light flash passing through it while in the first defined zero position energizes both of the detectors 45 and 46. In case the flash occurs within a limited range near this zero position, only one of the detectors will be energized. This range is broad enough so that it takes a considerable slippage or phase between disc 43 and the light pulse train, before more of the detectors are energized when lamp 36 flashes.

Detectors 45 and 46 are electrically powered from power lines $L_1$ and $L_2$, and they each have output circuits respectively comprised of two relays 47 and 48. Each relay has two contact blades. The blades indicated with subscript *a* are respectively connected in the energizing circuit of the other relay. Blades 47b and 48b control the current supply for a reversible electric motor 49, one blade for each direction of rotation.

Selsyn motor 49 is drivingly connected to a conventional gear reducer 50 operating upon a flexible shafting 51 terminating in a screw-threaded section 52 co-operating with a threaded element 53 which is integral with, or secured to, a valve housing 54. There is a conduit 55 with a flexible hose 56 linked to a conduit 57 to which is fed fluid from a pressure tank (not shown). There is an exhaust conduit 58 for housing 54, also having a flexible portion, and there is a conduit 59 communicating with valve housing 54. The flow in conduit 59 is controlled by this valve as described. Conduit 59 leads via a flexible portion to the hollow shaft 4 of propeller 25 as described in FIG. 1. Housing 54 constitutes a cylinder receiving a piston 60 having a piston rod 61 which is biased by a spring 62 and rests against a cam 63. Piston 60 is, furthermore, subjected to the forces exerted by a flyball governor 64 which is drivingly connected to propeller 25. Cam 63 is operated, first by a manual control lever 65, and second via a gear reducing device 66 from a motor 67, the function of which will be described later.

There is another control valve 68 with a manually cam controlled piston and a flyball governor controlling the pressure of fluid passing through conduit 69 for pitch control of propeller 26 (see also FIG. 1). This flyball governor is also geared to propeller 26. Valve 68 has a stationary housing and therefore does not require inlet and outlet conduits which are wholly or in part flexible. It will be appreciated that the pistons of the two control valves govern the pressure fluid supplied to and exhausted from the hydraulic pitch adjustment device of the two propellers 25 and 26. Any piston movement of control valve 68 varies the pitch of the blades of propeller 26, while any relative movement of housing 54 and piston 60 however produced, adjusts the pitch of the blades of propeller 25.

Going back to motor 67, this motor for purposes of the present invention is not a reversible one, but when energized, motor 67 actuates cam 63 so as to place and keep the piston rod 61 in such a position that the blades of propeller 25 assume the maximum pitch in which the propeller is said to be fully feathered. (This situation is shown in the drawing.)

Actuation of motor 67 is carried out by a relay 70 having blades 70a and 70b. Blade 70a normally governs the ignition circuit (not shown) for the engine driving propeller 25, relay 70 then being unenergized. While in its energized state, relay 70 interrupts the ignition circuit and blade 70a then connects the motor 67 to power line $L_1$ (the other terminal of motor 67 is always connected to line $L_2$). Blade 70b is a holding blade for relay 70. The holding circuit may be interrupted when cam 63 has assumed its ultimate position for feathering, as explained above, but this has been omitted for the sake of clarity.

There are two photo-electric detectors 71 and 72 which are both connected to, and control relay 70. Detectors 71 and 72 are so placed with respect to lamp 36, that they may only be energized by light pulses therefrom occurring at a large phase difference of slot 44. In other words, detector 71 will be energized when lamp 36 flashes much too early, as compared with the angular (zero) position of rotating slot 44 and detector 72 will be energized if the flash occurs much too late.

The control circuit, as shown, finally includes a switch 73 which, when opened, opens the control loop and places the pitch adjustment under exclusive manual control.

Figure 3:
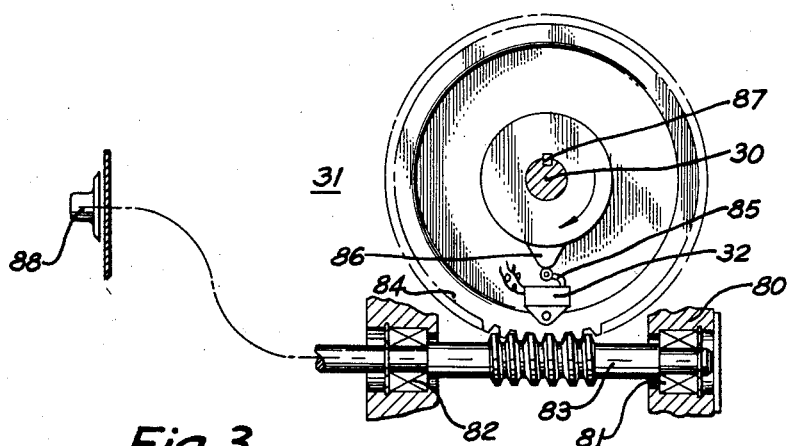
FIG. 3 is a detailed side-view of a switching mechanism employed in the device shown in FIG. 2.

Proceeding now to FIG. 3 there is shown in an enlarged view switching mechanism 31, controlling the electron tube 33 of FIG. 2. The device illustrated in FIG. 3 is to phase-adjust the closing of switch 32 with respect to shaft 30. Stationary support 80 which is part of the aircraft housing, serves to receive bearings 81 and 82 journalling a threaded bolt 83 which meshes with a disc 84. The switch 32 is mounted on this disc 84 and rotates therewith. Switch 32 has a feeler arm 85 engaging cam 86 secured to shaft 30 by means of a wedge 87. The disc 84 may be turned in rotating bolt 83 by means of a knob 88, which is part of the pilot's control board.

The device as described so far, operates as folows: assuming from the first that shafts 30 and 40 rotate in precise synchronism the following happens: the cam 86 together with the switch 32 produces a train of equally spaced switching pulses which open or render conductive an electron tube 33 so that lamps 35 and 36 emanate a train of equally spaced light pulses. The light pulses of course occur precisely at the time of switching the delay in the electronic device being negligible. Simultaneously shaft 40 rotates and turns instrument propeller 41 and disc 43 accordingly. In case of perfect speed synchronism as well as perfect phase relationship, the lamp 36 flashes precisely at that moment when propeller 41 has an upright position. The continuous light flashes accordingly and produces a standing picture of propeller 41. The standing position indicates to the pilot perfect synchronism. Simultaneously lamp 36 sends light pulses which pass through slot 44 at precisely that moment in which slot 44 has such a position that the light pulse reaches both of the detector amplifiers 45 and 46. Accordingly, energizing pulses are supplied to both relays 47 and 48. Due to the fact, however, that the relays have blades 47a and 48a which serve to mutually block the respective other relays when the relay to which they pertain is energized, both energizing pulses briefly render the relays 47 and 48 responsive, but the opening of the blades 47a and 48a causes the relays immediately to become de-energized. At this point it will be appreciated that the blades of the various relays have to be adjusted so that blades 47a and 48a open before the blades indicated with subscript 47b and 48b close. In other words, the simultaneous energization of photo-detectors 45 and 46 produces a mutual blocking of the two relays. Due to the fact that the light flashes are of very short duration, no new response is produced when the two blades 47a and 48a come to rest again.

A second possibility is that shafts 40 and 30 rotate in speed synchronism, but out of phase. In this case the rotation of propeller 41 and disc 43 occur at the same frequency as the lamp pulses, but there is a different phase relationship. If no control action is initiated, the pilot would see the image of instrument propeller 41 in an inclined position but still unmoving. In other words, the light pulses from lamp 35 always come a little too late or too early, but such time error is constant, so that the image of the instrument propeller remains still.

Considering the rotation as indicated by the arrow on disc 43, a lamp pulse from lamp 36 coming somewhat too early, means that only photo-electric detector 46 is energized. Photo-detector 45 is not energized and thus relay 47 does not respond. Accordingly, blade 47a remains closed and the energization circuit for relay 48 is not interrupted. Thus relay 48 is enabled to respond, opening blade 48a and closing blade 48b. Relays 47 and 48 may be relays with slight delay of release, so that relay 48 now remains in an energized position even after the light flash has decayed for a short period of time. The closing of blade 48b causes selsyn motor 49 to run in a particular direction. The rotation of motor 49 is transmitted via gear-reducer 50 and shafting 51, and worm 52 is rotated, thus causing the housing 54 to move with respect to piston 60.

Turning now briefly to FIG. 1 and considering the drawing and the description thereof, in connection with FIG. 2, it is assumed that maximum pitch, which means minimum air resistance of the propeller blades 1 and 2, occur at maximum pressure in cylinder 11 which, in turn, means the extreme possible position of cylinder 11 with respect to piston 8. In other words, in order to increase the speed of the propeller 25, pressure fluid must be permitted to pass into conduit 59. It was assumed that the pulses derived from propeller 26 come slightly too early, so that momentarily, propeller 25 has to be accelerated for a short period of time until a proper phase relationship has been reached. Thus, in case motor 49 is permitted to rotate by closing of the blade 48b, this rotation must be in such a direction that worm 52 moves housing 54 with respect to piston 60 in such a manner that the conduit 55 may communicate through this valve housing with conduit 59. This is actually shown in the drawing. In this case, pressure fluid is now permitted to enter housing 54 and to pass therethrough to conduit 59 so as to increase the pressure in the piston and cylinder mechanism of the pitch adjustment actuator. The pitch adjustment thus produced causes the propeller to be accelerated for a short period of time. The acceleration is transmitted to shaft 40 which rotates the propeller 41 and the disc 43 now slightly faster until the light pulses from lamp 36 also reach photo-cell 45. Accordingly the current supply circuit for relay 48 will be interrupted, and the mutual blocking effect of relays 47 and 48 comes into action again, i.e. it occurs again that both photo detectors 45 and 46 respond and nothing happens so that the motor 49 is not actuated anymore. However, it was said above that the propeller 25 originally was in speed synchronism with the propeller 26, but had a difference in phase only. The control action described thus far has actually increased the speed of propeller 25 which now only momentarily assumes the same phase as propeller 26, but this correct phate relationship will be destroyed because of the higher speed of the propeller 25, so that the flashes from lamp 36 will come somewhat too late. The pilot will observe this, in that the originally still but inclined image of propeller 41 begins to move, assumed the upright position, but continues to move out of the correct position again. Now detector 45 will be energized alone, and in a similar manner, as described above, the motor 49 will be energized by closing of blade 47b, and now rotates in the opposite direction. Accordingly, the screw 52 returns the housing 54 into a position as before. It will be apparent that with a proper selection of time responses of the various elements this control action will come to rest after only a few oscillations, observable as oscillations of instrument propeller 41 about the vertical position. Successively induced control actions in opposite directions with regard to increase and decrease of the speed of propeller 25 should be of decreasing duration until propeller 25 has assumed the exact position with respect to propeller 26.

It will be observed that flyball governor 64 closes valve housing 54 after every opening thereof. Thus, only small and definite amounts of pressure fluid will be fed to or discharged from cylinder 11 via conduit 59. This flyball governor thus operates as a stabilizing feedback loop.

The third mode of operation of this control device will be observed in case of speed asynchronism of the two propellers 25 and 26. The control actions as now introduced of course, are at first similar in character, as described before in connection with the phase adjustment, with the only distinction that in the end i.e. at precise synchronism the pressure in the pitch adjusting device, as well as the pitch itself of propeller 25, will be a different one than before. It will also be observed that in this case no counter control action in reversing the motor 49 will generally occur, for the simple reason that after a certain new balance, i.e. when a certain new speed has been reached, the two propellers rotate in synchronism and the lamp flashes will occur when disc 43 and propeller 41 are momentarily in zero position as defined above.

A fourth mode of operation is carried out if some kind of malfunction occurs causing asynchronism to increase to such an extent that the control action, as initiated by either of the photo-detectors 45 and 46, is unable to retain synchronism. In this case it will appear that one of the detectors 71 and 72 will be energized because the pulses from lamp 36 come much too early or much too late, and such off-zero position is not adjustable any more by any action of the motor 49. In this case, the relay 70 will respond and (1) interrupt the ignition of the engine driving propeller 25, and (2) blade 70b will close, causing motor 67 to start, and now cam 63 is placed in such a position that the propeller 25 is subjected to full pressure of the pressure fluid now permitted to pass through the chamber 54 without reclosing of the valve 59 by the flyball governor. The full pressure as developed now in the hydraulic actuator for the pitch adjustment of propeller 25 causes maximum pitch or full feathering of this propeller, which constitutes minimum air resistance thereof.

It will be observed that all of the control actions can be initiated manually in first opening the switch 73 and then in adjusting lever 65 so that the cam 63 moves the piston 60 with respect to the housing 54; again the flyball governor 69 will reclose the inlet of conduit 59 after a certain exhaust or increase of pressure in the hydraulic actuator has occurred, unless lever 65 is locked. It will further be observed, that in case of manual operation, the flashes of light still occur, and the instrument propeller 41 is also still rotating. Thus, in observing the instrument propeller, the pilot can observe the effect of this control action. This gives also the possibility that the pilot initially and before setting the device to automatic, can synchronise the two propellers manually as to speed, and the instrument propeller 41 enables him to judge when this full synchronisation has been reached, then he may block the manual lever 65 and close switch 73 so that any further action will be carried out fully automatically.

It will be further observed that the correct phase position of the respective elements can be adjusted by the device shown in FIG. 3 and that the switching pulses from the cam 86 exerted upon switch 32 will be fully synchronised with the instrument propeller 41. It will also be observed that an indirect manual control is achieved in that during "automatic," switch 73 being closed, a control action can be initiated by turning the knob 88, thus temporarily bringing the switching pulses and the light pulses in a different phase relation.

From the foregoing, it will be apparent that the invention is susceptible to a number of changes and modifications, some of them shall briefly be discussed in the following: For example, disc 43 and instrument propeller 41 can be driven by master propeller 26 while the switching pulses of the elements 31 and 32 can be initiated by the slave propeller 25.

Furthermore, it is possible to combine the function of two lamps 35 and 36 and use but one unit.

It is, furthermore, possible to employ an electronic flash equipment with an electron tube such as 33 initiating a discharge of a capacitor, so that pulses of given duration are produced by the then employed flash lamp. It is not necessary that the instrument propeller 41 and the disc 43 are driven by the same shaft. However, this is preferable because otherwise one would have to duplicate the flashing device.

The invention is not limited to the embodiment described above, but other changes and modifications that are not constituting departments from the spirit and scope of the invention, are intended to be covered by the following claims:

I claim:
1. An aircraft propulsion mechanism with synchronizable propellers comprising a master propeller, a separately driven slave propeller, a hydraulically operated device for adjusting the pitch of the master propeller, a separate hydraulically operated device for adjusting the pitch of the slave propeller, a pair of separately adjustable valves for controlling the flow of pressure fluid to or from each of said devices, a rotatable member driven from and in synchronism with the slave propeller, a light flasher driven from the master propeller for producing a series of light pulses in synchronism with the master propeller, means carried by said rotatable member for confining the light pulses to a single movable beam, a pair of closely adjacent photo-electric detectors in position to be traversed by the end of the beam and sufficiently close together to come simultaneously within the width of said beam, a reversible motor with reduction gearing for actuating the valve which controls the slave propeller, and a pair of relays connecting the motor with the two detectors for energizing the motor for rotation in one direction or the other.

2. The mechanism of claim 1, and also comprising another photo-electric detector, also within the path traversed by said beam but at a distance from the two first-mentioned detectors, and means energized by the last-mentioned detector for changing the setting of the valve which controls the slave propeller.

3. The mechanism of claim 2, and also comprising means energized by the last-mentioned detector for controlling the ignition of the engine of the slave propeller.

4. The mechanism of claim 1, and also comprising an instrument propeller mounted coaxially with said rotatable member and adjacent the light flasher, and a screen behind the instrument propeller for exhibiting the stroboscopic shadow of the latter.

5. The mechanism of claim 1, in which the valve that controls the slave propeller comprises a cylinder adapted to be moved axially by the reversible motor, and a cam-actuated piston.

6. The mechanism of claim 1, in which each valve comprises a cylinder and a piston, a flyball governor on the piston, and an adjustable cam for limiting the movement of the piston.

7. The mechanism of claim 1, in which the rotatable member consists of a disc with an aperture in it.

References Cited in the file of this patent

UNITED STATES PATENTS

| | | |
|---|---|---|
| 2,125,408 | Urfer | Aug. 2, 1938 |
| 2,319,218 | Drake | May 18, 1943 |
| 2,357,055 | Mydans | Aug. 29, 1944 |
| 2,440,083 | Gley | Apr. 20, 1948 |
| 2,715,707 | Haskins | Aug. 16, 1955 |
| 2,840,170 | Best | June 24, 1958 |

FOREIGN PATENTS

| | | |
|---|---|---|
| 1,023,125 | France | Dec. 24, 1952 |